United States Patent [19]
Maddox

[11] Patent Number: 5,522,729
[45] Date of Patent: Jun. 4, 1996

[54] NEATNESS EDUCATIONAL AID FOR CHILDREN

[76] Inventor: Keith E. Maddox, 14315 SE. 4th St., Apt. B, Bellevue, Wash. 98007

[21] Appl. No.: 224,313

[22] Filed: Apr. 7, 1994

[51] Int. Cl.⁶ ................................................ G09B 19/00
[52] U.S. Cl. ........................... 434/236; 248/97; 248/100; 383/38
[58] Field of Search ........................... 434/236; 248/97, 248/99, 100; 383/118, 38; D3/319; D32/36, 37

[56] References Cited

U.S. PATENT DOCUMENTS

| 52,288 | 1/1866 | Hills et al. | 248/100 |
|---|---|---|---|
| 277,772 | 5/1883 | Nelson | 248/100 |
| D. 349,372 | 8/1994 | Bird et al. | D32/37 |
| 895,759 | 8/1908 | Hulbert | 248/100 |
| 1,519,698 | 12/1924 | Person | 248/100 X |
| 2,080,252 | 5/1937 | Cook . | |
| 3,977,450 | 8/1976 | Schampier . | |
| 4,094,351 | 6/1978 | Catenaccio | 383/38 X |
| 4,739,880 | 4/1988 | Sawyer et al. . | |
| 4,750,639 | 6/1988 | Schaerer | 383/38 X |
| 5,000,582 | 3/1991 | Pierson . | |
| 5,050,998 | 9/1991 | Wachtel | 383/38 X |

Primary Examiner—Cary E. O'Connor
Assistant Examiner—Jeffrey A. Smith
Attorney, Agent, or Firm—David L. Baker; Rhodes & Ascolillo

[57] ABSTRACT

The invention is an educational device for children which is intended to teach children to be neat and orderly as well as color identification and left/right identification. It consists of a container supported in a stand or wall mount. The container is divided into at least two cells identified by color or indicia that lets children imagine that they are feeding a creature when they put an article into the container. The container may be formed from a flexible elastic or stretch material which will cause the creature to give the appearance of becoming fat as it fills up.

2 Claims, 3 Drawing Sheets

NEATNESS EDUCATIONAL AID FOR CHILDREN

FIELD OF THE INVENTION

The invention relates generally to educational toys and devices and more particularly to a device that will teach children to be neat and tidy in an enjoyable manner.

BACKGROUND OF THE INVENTION

One of the most exasperating challenges for parents is to attempt to teach children the value of neatness and organization in their life. It isn't until the opportunity has past that parents realize that there was an opportunity. Any attempt to begin teaching a teenager the benefits of neatness and organization is almost bound to fail despite the good intentions of the teacher. Therefore the time to cast the seeds of good instruction and training is a young age when training tools and devices can take the form of toys and games.

SUMMARY OF THE INVENTION

This invention attempts to provide an educational device that will make it interesting and fun for young children to pick up their clothes and toys. The invention consists of a stand, either fixed or transportable, that will support a collection device. In its preferred form the collection device is a container made from canvas or a stretch material readily available on the retail market. The stand holds the container in an open, upright posture such that articles may be deposited with ease and convenience. At this point the invention is not unlike an ordinary clothes hamper, however the container is constructed in multiple parts having at least two cells. The cells are designed to appeal to a child's interest and identified by markings that will make it a pleasure for the child to fill. By way of example, a container could have two cells. One cell for light clothes and one cell for dark clothes, the side for light would display a light color and the side for dark would display a dark color, teaching the child that clothes should be separated accordingly. The same principle would hold true with left hand-right hand indicia. In addition the container could have displayed on it, a creature with its head tilted up forming the opening of the container and its belly exposed giving the appearance of becoming fat as the clothes or toys are placed into the container. Siblings could each have their own set and the parent could give a prize for the heaviest or largest container at weeks end.

It is therefore an object of the invention to provide a new and improved neatness and organizational education device for children.

It is another object of the invention to provide a new and improved educational training device that is simple but effective when used with children.

It is a further object of the invention to provide a new and improved educational training device that may be easily and efficiently manufactured and marketed.

It is still another object of the invention to provide a new and improved educational training device which is of durable and reliable construction.

These and other advantages, features and objects of the invention will become more apparent from the following description taken in connection with the illustrative embodiment in the accompanying drawings.

DESCRIPTION OF THE PREFERRED EMBODIMENTS

Figure 1:
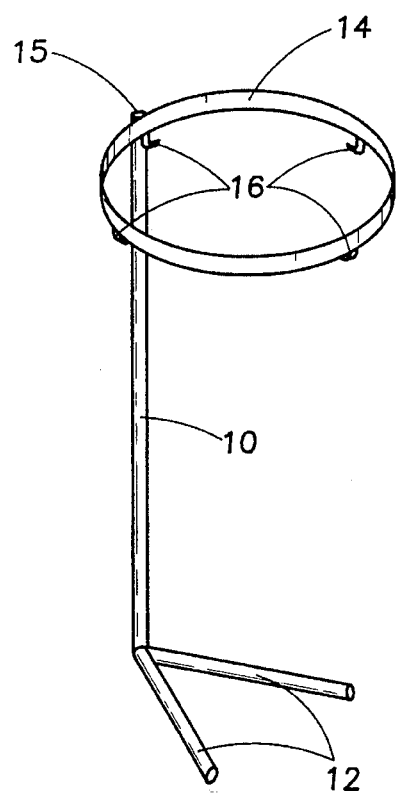
FIG. 1 is a perspective view of a stand that could be used with the invention.

Referring now to FIG. 1 there is shown a shaft 10 having a pair of supporting legs 12 at one end and a ring 14 attached along its perimeter 15 to the opposite end. Along the perimeter of the ring are four restraining clips 16, spaced equidistant and facing inwardly.

Figure 2:
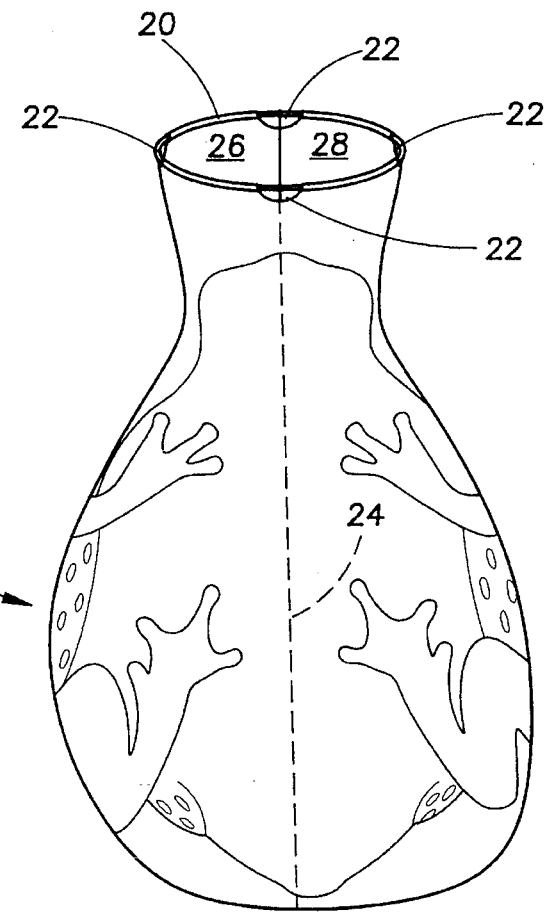
FIG. 2 is a perspective view of the container of the invention.

Concerning FIG. 2 a flexible container is shown generally at 18. The container may be formed of canvas or any of the stretch materials currently available on the retail market. The container has an opening at one end which is defined by the ring 20. Apertures 22 appear in the container contiguous with ring 20 and so spaced as to engage retaining clips 16 in the stand ring 14. The container has a partition 24 dividing the container into two cells 26 and 28. Printed on the container is a caricature of a frog with it's head facing upwardly making the opening to the container appear to be the frog's mouth. As articles are placed into the container the belly will grow larger and appear to be gaining weight.

Figure 3:
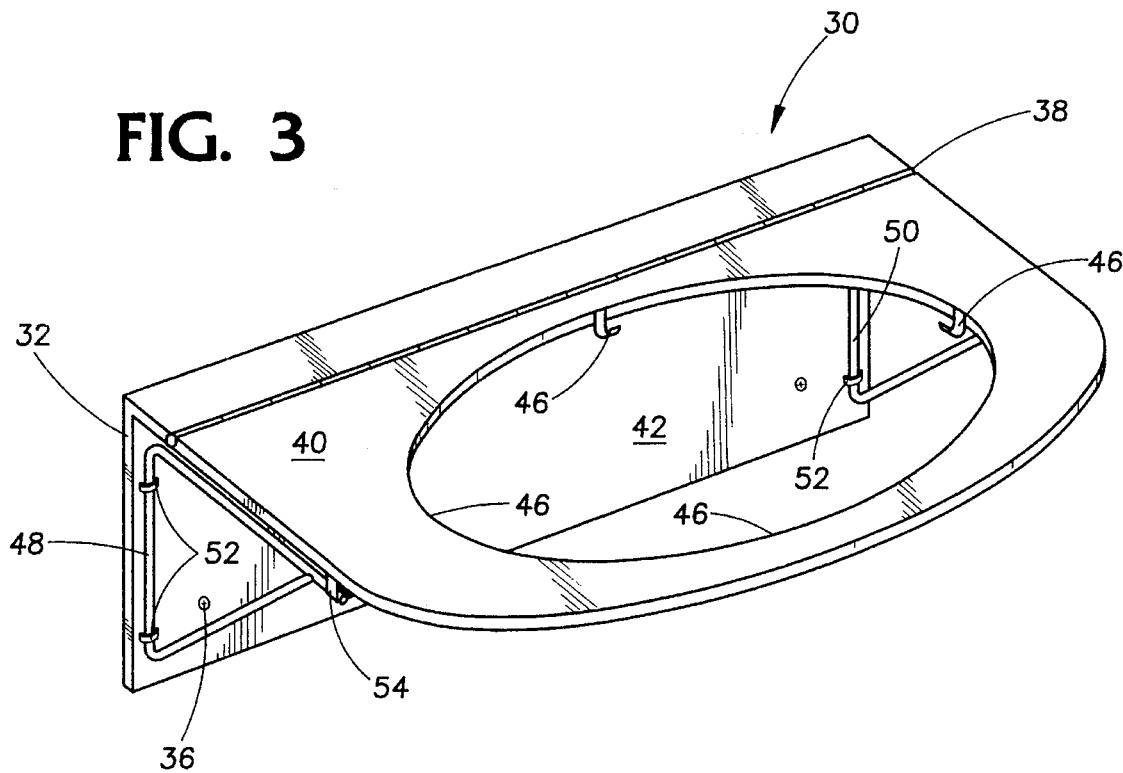
FIG. 3 is a perspective view of another stand that could be used with the invention.
Figure 4:
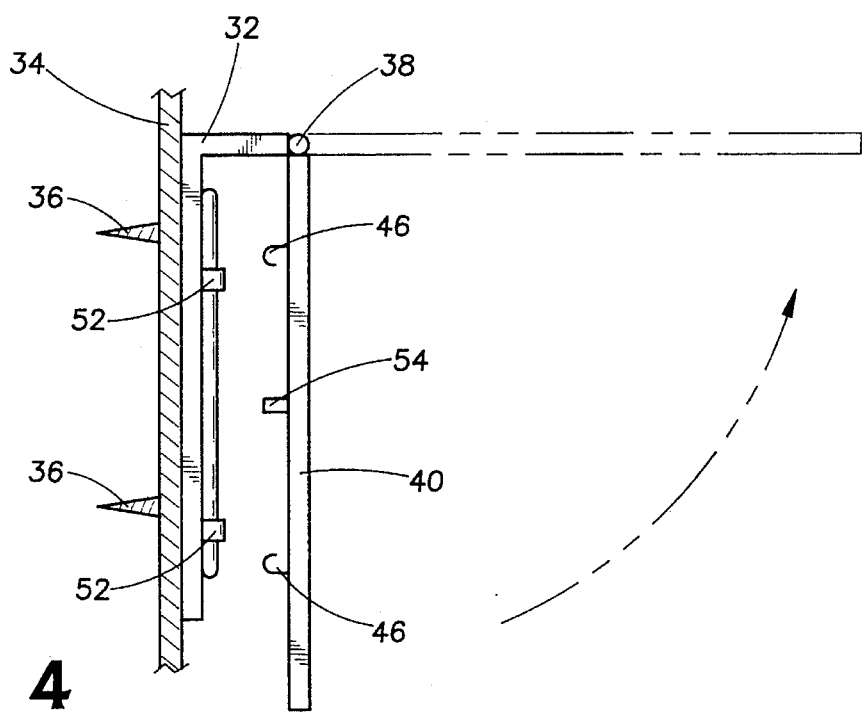
FIG. 4 is a side elevation view of the stand of FIG. 3 in a folded condition.

Referring to FIGS. 3 and 4 there is shown an alternative form of stand generally at 30. The stand has a base member 32 which is suitable for attachment to a verticle support such as wall 34 by screw fasteners 36. Attached to the base member by hinge 38 is the main support member 40. An aperture 42 is located centrally of the main support member and retaining clips 46, face inwardly and are spaced equidistant around the perimeter of the aperture.

Main support 40 is held in the extended position (FIG. 3) by a pair of triangularly shaped side support brackets 48, 50. The side supports are held in position by mounting means 52. The side supports are allowed to swing against base member 32 when main support member 40 is in the folded position (FIG. 4). In the extended position the main support member 40 is held extended by the side supports which are brought away from base member 32 and come to rest against the support stop 54.

Figure 5:
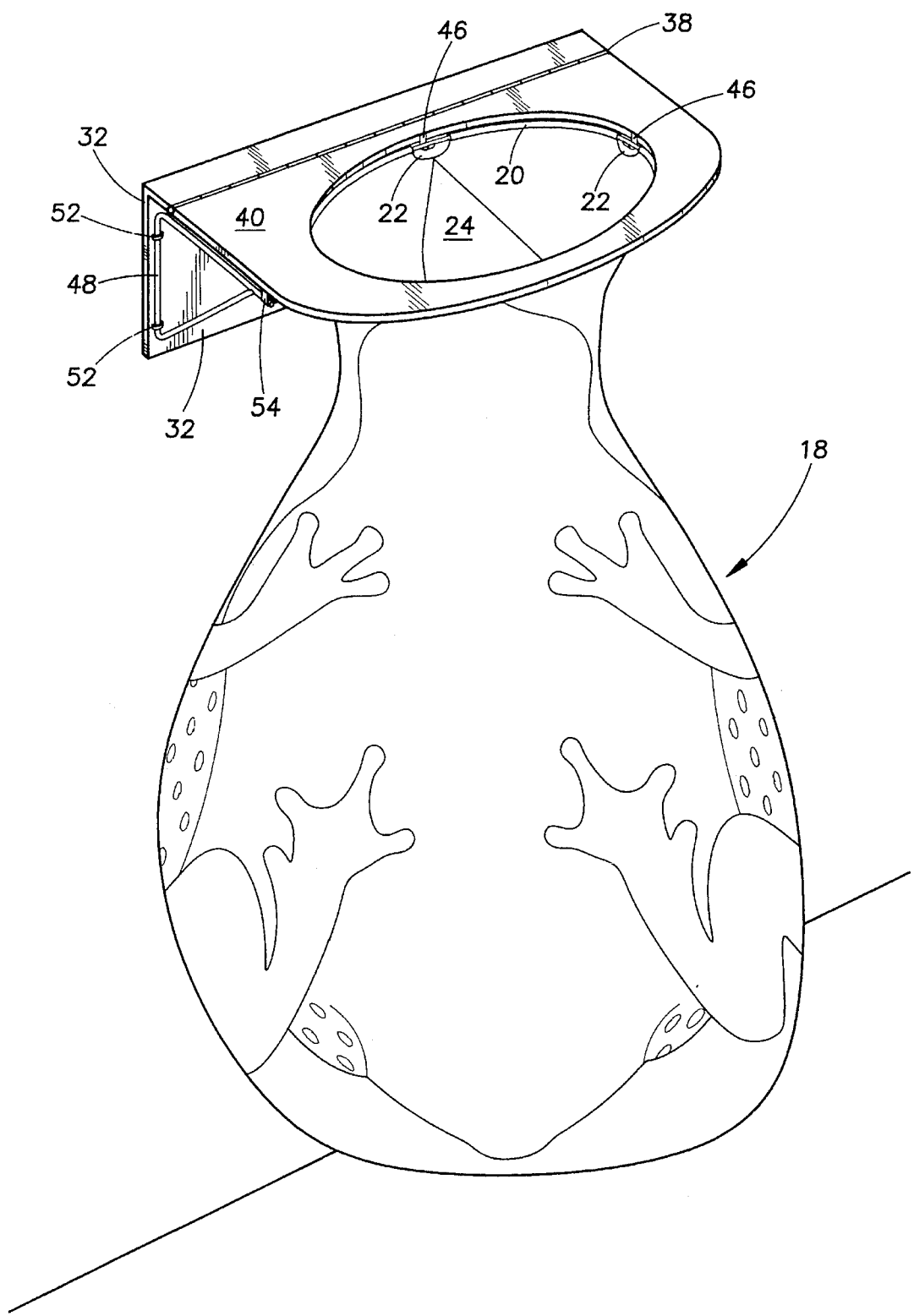
FIG. 5 is a perspective view of the stand of FIG. 3 with a container in place.

In FIG. 5 there is shown a complete educational aid as it would be set up for use by children. The main support is extended and container 18 is held by restraining clips 46 which engage ring 20 through apertures 22. The container is divided by partition 24 into two cells which may be used for light and dark clothes for example. If that is the case the outside of the container could be colored appropriately to indicate light and dark colors. The cells could also be utilized for siblings toys in which case there could be a caricature on each cell representing that child. Similarly, the opening to the container could represent a basketball hoop and the children could enjoy dunking their clothes or toys.

Although this invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. An educational device for teaching children neatness and orderliness comprising:

a self supporting stand having a shaft;

legs connected to one end of the shaft for supporting the shaft in a vertical orientation;

a ring attached to the other end of the shaft;

said ring attached at a point on its outside perimeter;

said ring having:

a plurality of inwardly facing retaining means affixed to the inside perimeter and spaced equidistant around the ring;

a container means removeably suspended from said retaining means for the temporary storage of articles;

said container means is a sack divided into a plurality of cells;

each cell is identified by a color;

one cell identified by a light color and one cell identified by a dark color;

the sack includes a representation, on its outer surface, of a creature so positioned that the opening of the sack appears to be the mouth of the creature;

the opening is held in an open position, providing ingress to the cells of the sack, around the ring; and the sack is formed from a flexible and expandable material.

2. An educational device for teaching children orderliness and neatness comprising:

a first support means adapted to be affixed to a vertical, planar surface;

a second support means movably and hingedly attached to said first support means;

said second support means has a range of motion from parallel to the vertical surface to perpendicular to the vertical surface;

said second support means having an aperture therein and a plurality of inward facing restraining means positioned equidistant around the perimeter of the aperture;

a third support means mounted on the first support means;

said third support means adapted to support the second support means in a position perpendicular to the vertical surface;

a container means suspended from the second support means;

the third support means comprises a pair of vertically mounted, triangularly shaped brackets hingedly adapted to swing toward and away from said first support means;

the container means is a sack divided into a plurality of cells;

the cells are identified by color;

the sack includes a representation of a creature so positioned that the opening of the sack appears as the creatures mouth;

the opening is held in an open position, providing ingress to the cells of the sack, around the aperture in the second support means;

the sack is formed from a flexible and expandable material.

* * * * *